Sept. 4, 1928.     1,683,522
F. L. BROUSSOUSE
METHOD OF DAMPING OSCILLATIONS FOR USE WITH SUSPENSION
LEAF SPRINGS AND THE LIKE
Filed July 12, 1924
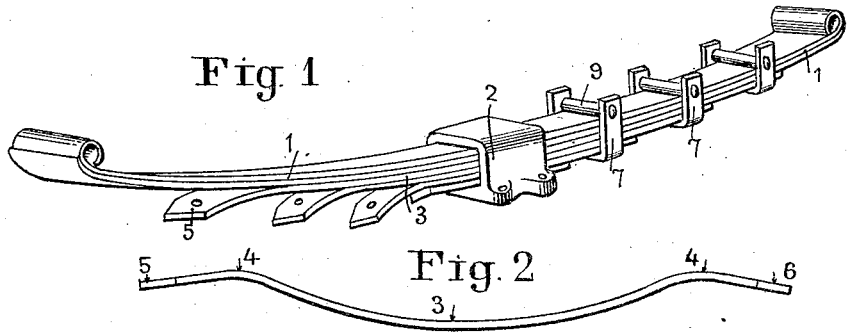
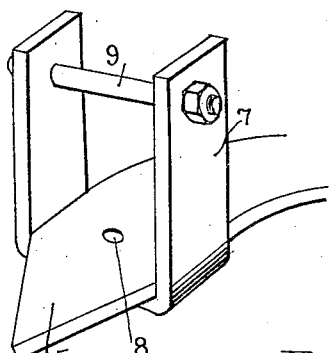
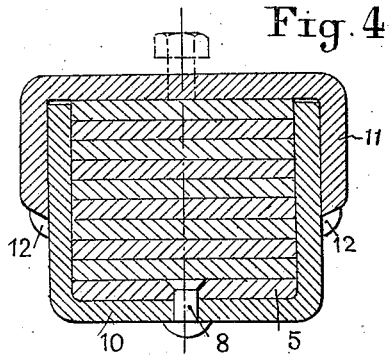
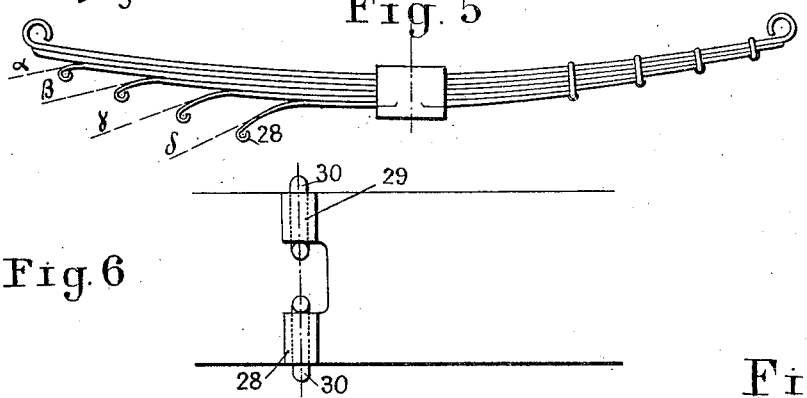
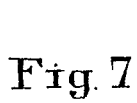
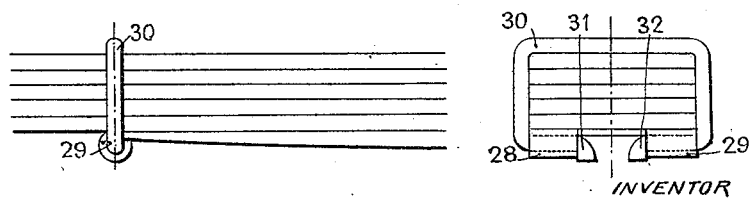
INVENTOR
Fernand L. Broussouse
BY
ATTORNEYS Patented Sept. 4, 1928.

1,683,522

UNITED STATES PATENT OFFICE.

FERNAND LOUIS BROUSSOUSE, OF PARIS, FRANCE.

METHOD OF DAMPING OSCILLATIONS FOR USE WITH SUSPENSION LEAF SPRINGS AND THE LIKE.

Application filed July 12, 1924, Serial No. 725,570, and in France July 12, 1923.

This invention has for its object an improved method of damping the oscillations of suspension leaf springs and the like.

Leaf springs are used in numerous forms and more particularly for the suspension of automobile vehicles and other machines because of the great resiliency which they possess, but they have however the inconvenience of giving rise to quick and violent reactions, and efforts have been made to decrease these defects by the use of damping devices of various kinds.

The method according to the present invention which allows of damping the oscillations consists in creating between the leaves constituting the spring, and by means of a static tension of a part of each of the said leaves themselves, an elastic friction of an intensity which may be regulated tending to oppose the continuity of the oscillations and thus obtaining a very smooth suspension.

The present method of damping is more particularly characterized by the fact that the static tensions of the successive spring leaves increase respectively from the extremities of the various springs towards the middle where they are clamped and held for the purpose of thus determining a damping of the oscillations of the springs, which is the greater, the greater the amplitude of the oscillation.

Such an arrangement is obtained by a modification of the additional curve of the leaves. But in addition to this, a particular strap construction is used intended to obtain a suitable tightening of the springs, at the same time reducing the projection of the strap over the whole of the spring.

In the accompanying drawings which illustrate by way of example, constructional forms of one embodiment of the invention applied to a suspension spring for an automobile vehicle:

Fig. 1 is a perspective view of the whole of the spring, the left hand part of this figure showing the suspension spring before the members connecting the leaves have been placed in position whilst the right hand part shows the spring, complete and finished, Fig. 2 is an edge of one of the leaves, Fig. 3 is a perspective view of a connecting member detail, and Fig. 4 is a section of a modification of this connecting device, Fig. 5 illustrates, in the same manner as in Fig. 1 a spring, the leaves of which are free on the left hand side and joined on the right hand side.

Figs. 6, 7 and 8 show respectively a bottom plan view, side elevation and end view of one of the connecting straps in detail.

Referring more particularly to Figs. 1 and 2 each of the springs comprise one or two main leaves 1 for the purpose of being connected for example to the frame of the vehicle in the usual manner by any suitable members.

The other leaves 3 have, as indicated more particularly in Figure 2 in addition to the usual curvature in the same direction as the main leaves a second curvature 4, of different direction from that of the general curvature of the leaf 3, the extremities 5, 6 being bent downwardly.

In order to build up the complete spring, the various leaves are held together at the centre by the usual strap or buckle 2 intended to be carried upon the axle, then at the extremities of the several leaves 3, which as hereinbefore stated are bent downwardly, is arranged a maintaining strap 7, the form of which resembles, that of the securing straps usually employed, and by which the bent ends of the several leaves, are drawn up into contact with either the main leaf or the adjacent leaf 3.

Owing to such an arrangement, each strap 7 subjects the part 4, 5 or 4, 6 of the leaf to strong tension and maintains it in this condition. Thus there is exerted upon each leaf a supplementary pressure due to the elasticity of each of the parts 4, 5 or 4, 6 a pressure which is maintained at the static state and which considerably increases the internal friction of the leaves.

On the other hand the securing strap being fixed on the extremity 5 of the spring by the pivot or rivet 8, and being strongly tightened by the bolt 9 on the main leaf under the effect of the normal tension of the part 4, 5 or 4, 6 is unable to fall or to tilt during the normal tension of the spring.

Instead of using the fixing straps 7 as shown in Figs. 1 and 3, each of these securing straps could be, as indicated in Fig. 4, constituted by two parts 10, 11, the one within the other, the lower part 10 being fixed on the extremity 5 of the corresponding leaf by the rivet 8 and the two parts 10, 11 could be maintained connected in any suitable manner, for example by autogeneous welding at 12 or in any other suitable manner, this soldering being effected at the same time as the assembled leaves are clamped into normal position. The same soldering could be effected on a ring forming a strap, having two joined ends.

This construction is particularly advantageous because of its great strength for the springs working with great stress.

It is to be noted that the whole of all the securing straps give to the springs a great mechanical strength and allow them to offer the minimum of inconvenience should there be accidental breakage of one of the leaves.

The double curvature 4 may be applied on all or on only part of the leaves 3 other than on the main leaves 1 and this curvature may extend for a suitable length from each end of the leaf.

The maintenance of the spring leaves in mounted position, indicated on the right hand part of Fig. 1, may be effected in any suitable manner, and the tightening obtained by these straps may be suitably controlled, if desired, by arranging a regulating screw engaging in the element 11, and bearing against the main leaf 1, as indicated in dot and dash lines in Fig. 4, a certain amount of play being then, if necessary, provided between the main leaf and the element 11.

The double curvature of the springs could be obtained either as indicated in Fig. 2 by giving to the extremities of the springs a curvature directed oppositely to that of the general curvature of the leaf, or by giving to these extremities, a curvature in the same direction but of different radius from that of the main curvature, the maintaining straps then being suitably arranged for ensuring contact between the leaves.

The invention is applicable in all cases where leaf springs are used and more particularly where these springs are likely to be subjected to shocks or vibrations of variable intensity as it is the case for example with the suspensions of automobile vehicles and the like.

In the constructional form shown in Figures 5 to 8 it is to be noted that all or some of the leaves have the curvature described in Figures 1 to 4 with the characteristic that the angles $\alpha, \beta, \gamma, \delta$, which, together with the general direction of the spring form the additional curvatures of the several leaves, increase from the extremities to the centre $\alpha < \beta < \gamma < \delta$ for the purpose of obtaining a tightening together of the leaves, obtaining the damping.

But because of the increasing value of the angles $\alpha, \beta, \gamma, \delta$ the small oscillations which only affect the extremity of the spring receive a weak damping action because the static tension of the tightening at $\alpha$ is weaker than at $\beta, \gamma, \delta$ whilst the large oscillations which affect the whole of the spring are damped by the whole of the static tensions of the tightening given by the sum of $\alpha, \beta, \gamma, \delta$.

Moreover, each extremity of the leaves bears a double ring having eyes, such as 28—29, in which the ends of a strap 30 are introduced having preferably a circular section, and being rolled as more especially shown in Fig. 8, and the extremities of which are turned back at 31—32 after having penetrated the eyes 28—29 so as to constitute holding hooks.

The positioning of such straps is effected by a suitable tool allowing of the fixing and the curving of the said straps so as to maintain the leaves under tension; the form of this strap being simple and incapable of getting out of order.

What I claim is:

1. A plurality leaf spring of the character described, the leaves having a curved body portion and extremities, the extremities of one or more of said leaves having a curvature differing in form from that of the general curvature of the spring, and means for forcing the extremities of such leaves under tension into contact with the other leaves forming the body of the spring, said means consisting of a maintaining strap.

2. A spring as defined in Claim 1, further characterized by eyes at the extremities of the leaves, and the maintaining strap having a circular cross section and having its extremities turned back to form hook-like attaching means, said hooks engaging said eyes at the extremities of said leaves.

In testimony whereof I have hereunto set my hand.

FERNAND LOUIS BROUSSOUSE.